US009157361B2

(12) United States Patent
Ho

(10) Patent No.: US 9,157,361 B2
(45) Date of Patent: Oct. 13, 2015

(54) PIVOTING FLUID FILL PORT FOR A FLUID SYSTEM OF A VEHICLE

(75) Inventor: Li-Jen Peter Ho, Farmington Hills, MI (US)

(73) Assignee: GM Global Technology Operations LLC, Detroit, MI (US)

(*) Notice: Subject to any disclaimer, the term of this patent is extended or adjusted under 35 U.S.C. 154(b) by 688 days.

(21) Appl. No.: 13/492,113

(22) Filed: Jun. 8, 2012

(65) Prior Publication Data

US 2013/0327418 A1    Dec. 12, 2013

(51) Int. Cl.
*F01P 11/00* (2006.01)
*F01P 11/02* (2006.01)
*F02B 29/04* (2006.01)

(52) U.S. Cl.
CPC ......... *F01P 11/0214* (2013.01); *F02B 29/0462* (2013.01); *Y02T 10/146* (2013.01); *Y10T 137/3802* (2015.04)

(58) Field of Classification Search
CPC .............. F01P 11/0204; F01P 11/0214; F01P 11/0228; F02B 29/0462; Y02T 10/146
USPC .......................... 141/98, 369, 379; 123/41.01
See application file for complete search history.

(56) References Cited

U.S. PATENT DOCUMENTS

| 1,759,305 | A  | * | 5/1930  | Granstedt ...................... 165/73 |
|-----------|----|---|---------|---------------------------------------|
| 5,215,157 | A  | * | 6/1993  | Teich ......................... 180/69.24 |
| 5,613,843 | A  | * | 3/1997  | Tsuru et al. ................... 417/313 |
| 6,234,544 | B1 | * | 5/2001  | Bartholomew ............... 285/319 |
| 7,874,391 | B2 | * | 1/2011  | Dahl et al. ................. 180/89.12 |
| 8,191,365 | B2 | * | 6/2012  | Quinn et al. .................... 60/599 |
| 2007/0228727 | A1 | * | 10/2007 | Matsuno et al. ............. 285/305 |
| 2008/0035404 | A1 | * | 2/2008  | Dahl et al. .................... 180/233 |
| 2010/0108039 | A1 | * | 5/2010  | Quinn et al. .................. 123/563 |

* cited by examiner

Primary Examiner — Nicolas A Arnett
(74) Attorney, Agent, or Firm — Quinn Law Group, PLLC

(57) ABSTRACT

A liquid cooling system includes at least one fluid line in fluid communication with an intercooler for circulating a coolant through the intercooler. An inlet port assembly interconnects the intercooler and the at least one fluid line. The inlet port assembly defines an opening for introducing the coolant into the liquid cooling system. The inlet port assembly is rotatable relative to the intercooler and the at least one fluid line between a fill position, in which the opening is disposed in a vertically upright orientation, and at least one operating position, in which the opening is disposed in a non-upright orientation. A shield is moveably positioned relative to the intercooler to define an attached position preventing rotation of the inlet port assembly into the fill position, and a detached position, allowing rotation of the inlet port assembly into the fill position.

20 Claims, 4 Drawing Sheets

PIVOTING FLUID FILL PORT FOR A FLUID SYSTEM OF A VEHICLE

TECHNICAL FIELD

The invention generally relates to a fluid fill port assembly for a fluid system of a vehicle, and more specifically to a fluid fill port assembly for a coolant system circulating a coolant through an intercooler for a supercharger.

BACKGROUND

Vehicles using a supercharger for compressing combustion air may use an intercooler for cooling the air after being compressed by the supercharger. The intercooler may include a liquid cooling heat exchanger, which circulates a liquid therethrough to absorb the heat from the compressed air. As with all liquid cooling systems, the coolant levels must be occasionally checked, and/or additional coolant must be added to the cooling system to maintain optimal performance of the cooling system.

The level of the coolant in the cooling system is preferably checked at the highest elevation of the cooling system. Similarly, in order to gravity feed additional coolant into the cooling system, the additional coolant must be added at the highest elevation of the cooling system. The highest elevation of the intercooler liquid cooling system is generally located at the intercooler, above the engine. Accordingly, this is the optimal location for a fluid fill inlet port for checking the level of and adding additional coolant into the cooling system. However, this location is usually covered by a shield. Packaging of the shield generally prevents an opening of the inlet port assembly from being disposed in a vertically upright position.

SUMMARY

A fluid system for a vehicle is provided. The fluid system includes at least one fluid line defining a fluid flow circuit for circulating a fluid therethrough, and an inlet port assembly attached to the at least one fluid line. The inlet port assembly defines an opening in fluid communication with the fluid flow circuit for introducing the fluid into the fluid flow circuit. The inlet port assembly is rotatable about an axis relative to the at least one fluid line between a fill position and at least one operating position. When the inlet port assembly is disposed in the fill position, the opening is disposed in a vertically upright orientation. When the inlet port assembly is disposed in the at least one operating position, the opening is disposed in a non-vertical orientation.

A vehicle is also provided. The vehicle includes an intercooler configured for cooling a flow of compressed combustion air from a compressor, and a liquid cooling system. The liquid cooling system is in fluid communication with the intercooler, and includes at least one fluid line defining a fluid flow circuit for circulating a coolant through the intercooler. An inlet port assembly is attached to the intercooler and interconnects the intercooler and the at least one fluid line. The inlet port assembly defines an opening in fluid communication with the fluid flow circuit for introducing the coolant into the fluid flow circuit. The inlet port assembly is rotatable relative to the intercooler and the at least one fluid line between a fill position and at least one operating position. When the inlet port assembly is disposed in the fill position, the opening is disposed in a vertically upright orientation. When the inlet port assembly is disposed in the operating position, the opening is disposed in a non-vertical orientation.

Accordingly, the inlet port assembly may be positioned in the operating position, with the shield in the attached position, during normal operation of the vehicle. In order to check the coolant level and/or add additional coolant into the intercooler liquid cooling system, the shield is moved into the detached position, and the inlet port assembly is then rotated into fill position, with the opening of the inlet port assembly disposed in the vertically upright position. After checking the coolant level and/or adding additional coolant to the intercooler liquid cooling system, the inlet port assembly may be rotated back into the operating position, thereby allowing the shield to be moved back into the attached position.

The above features and advantages and other features and advantages of the present invention are readily apparent from the following detailed description of the best modes for carrying out the invention when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the invention, as defined by the appended claims.

Figure 1:
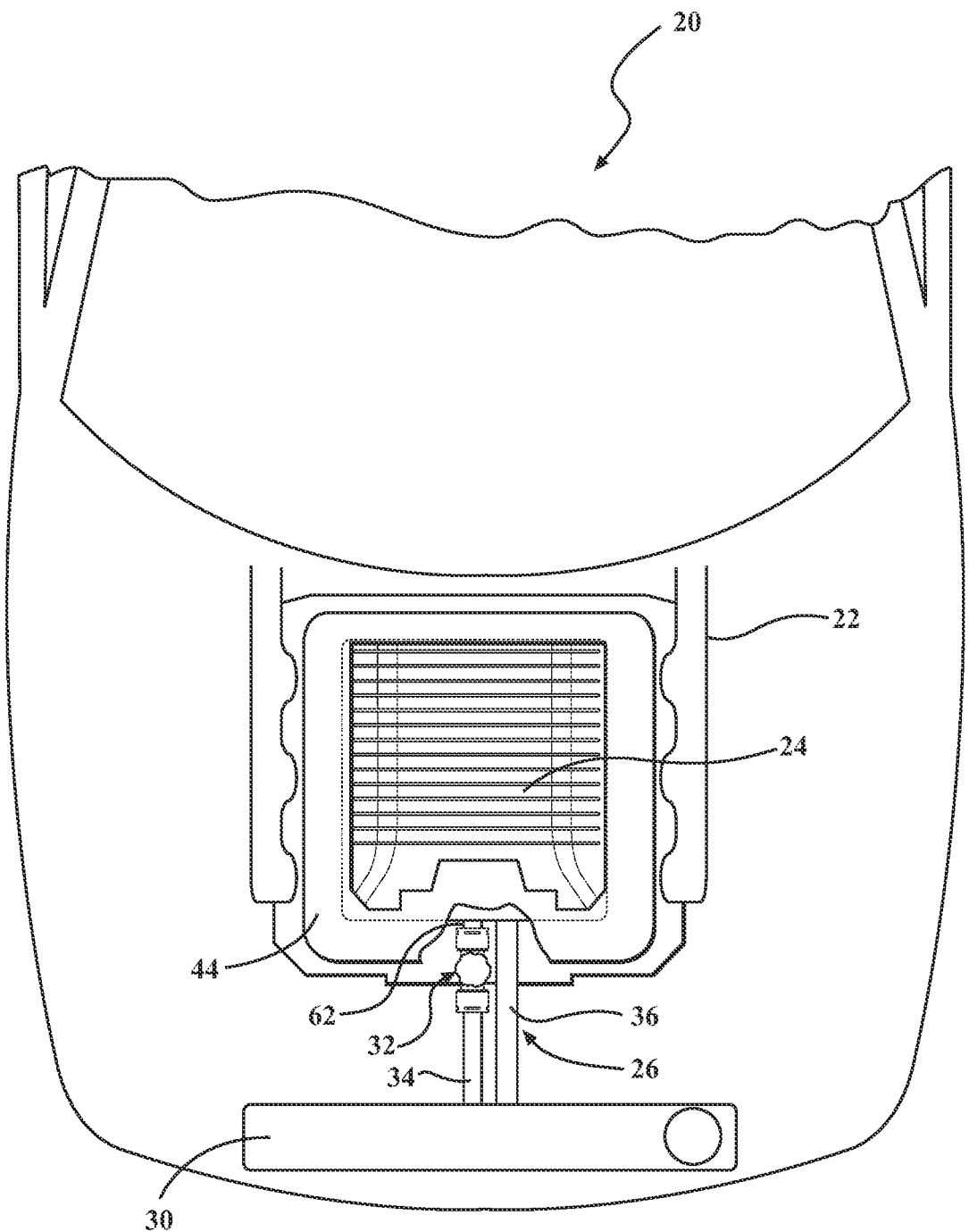
FIG. 1 is a schematic plan view of a vehicle showing an intercooler and a liquid cooling system coupled to the intercooler for circulating a coolant through the intercooler.

Referring to the Figures, wherein like numerals indicate like parts throughout the several views, a vehicle is generally shown at 20. Referring to FIG. 1, the vehicle 20 includes an engine 22, such as but not limited to an internal combustion engine 22, and a compressor (not shown), such as a supercharger. The compressor compresses combustion air for the engine 22. The vehicle 20 may further include a cooling device, such as and hereinafter referred to as an intercooler 24. The intercooler 24 is coupled to the compressor, and cools the flow of compressed combustion air exiting the compressor, prior to the combustion air entering a combustion chamber of the engine 22.

A cooling system 26 is coupled to the intercooler 24, and includes at least one fluid line 34, 36 in fluid communication with the intercooler 24. The fluid lines 34, 36 partially define a fluid flow circuit for circulating a fluid, such as a coolant, through the intercooler 24. The cooling system 26 may further include a heat exchanger 30, such as but not limited to a radiator, for dissipating heat from the coolant. The heat exchanger 30 is in fluid communication with the fluid lines 34, 36, and defines at least part of the fluid flow circuit.

Figure 2:
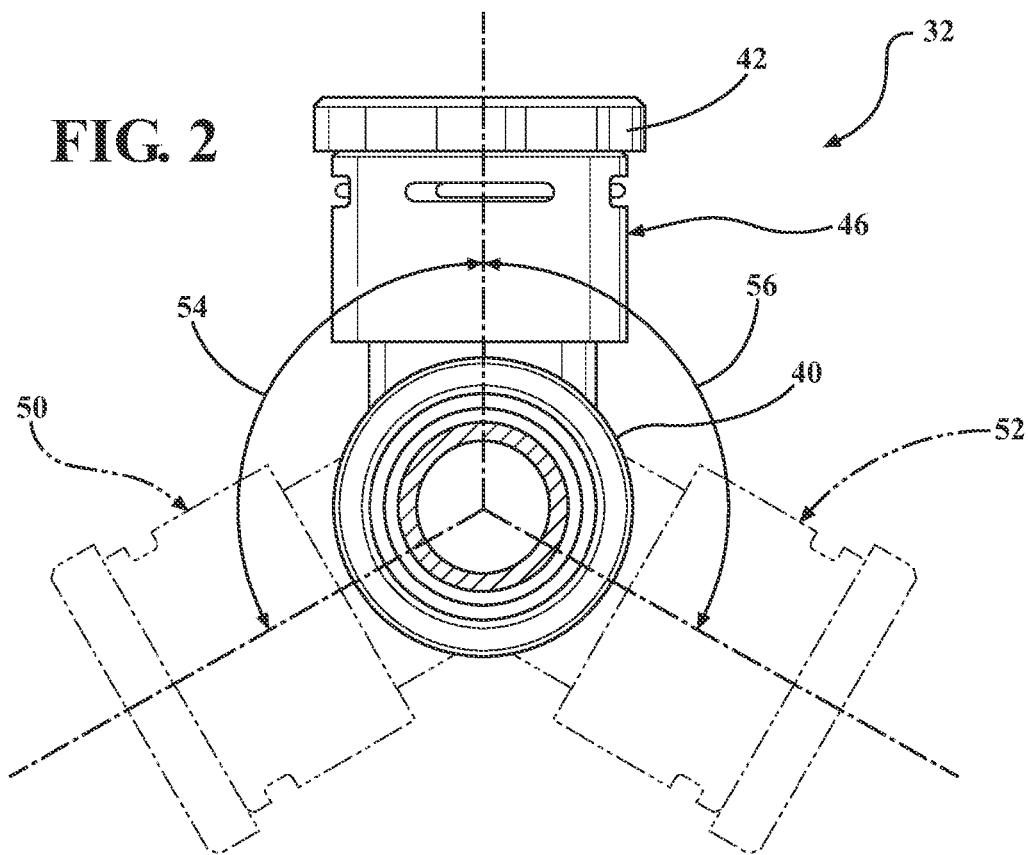
FIG. 2 is a schematic plan view from a front perspective of the vehicle with a shield removed to expose an inlet port assembly shown in a fill position in solid lines, and a first operating position and a second operating position of the inlet port assembly shown in phantom.

Referring to FIG. 2, an inlet port assembly 32 is attached to the intercooler 24 and at least one of the fluid lines 34, 36, and interconnects the intercooler 24 and the fluid lines 34, 36 of the cooling system 26 in fluid communication. As shown, a first fluid line 34 interconnects the heat exchanger 30 and the inlet port assembly 32, and a second fluid line 36 interconnects the intercooler 24 and the heat exchanger 30. The inlet port assembly 32 defines an opening 38, shown in FIG. 4, which is in fluid communication with the fluid flow circuit. The opening 38 is used to introduce the coolant into the fluid flow circuit, and to check the level of the coolant in the cooling system 26. The inlet port assembly 32 includes a housing 40 that defines the opening 38. A cap 42 is removeably attached to the housing 40 for sealing the opening 38. Accordingly, when the cap 42 is attached to the housing 40, the cap 42 closes the opening 38 and seals the opening 38 to keep the coolant in the cooling system 26. When the cap 42 is detached from the housing 40, the opening 38 is exposed, and the coolant level may be checked and/or coolant may be introduced into the cooling system 26. Because the coolant is introduced into the coolant system through gravity, the opening 38 must be located at the highest elevation of the cooling system 26, at a higher elevation than the rest of the cooling system 26, including the fluid lines 34, 36 and the intercooler 24, so that the coolant flows down into the cooling system 26.

As shown in FIG. 1, the vehicle 20 may include a shield 44, such as an acoustic or heat shield 44, that is positioned over the engine 22. The shield 44 is moveable between an attached position, shown in FIG. 1, and a detached position, in which the shield 44 is removed, shown in FIG. 2. When the shield 44 is disposed in the attached position, the shield 44 covers at least a portion of the engine 22, and the inlet port assembly 32. Referring to FIG. 2, the shield 44 is removed from the engine 22 to define the detached position of the shield 44. When in the detached position, the shield 44 does not cover the inlet port assembly 32. The shield 44 may be attached to the engine 22 in any suitable manner. When in the attached position, the shape and packaging of the shield 44 over the inlet port assembly 32 precludes orientation of the opening 38 in a vertically upright position. Accordingly, the inlet port assembly 32 is rotatable relative to the intercooler 24 and the first fluid line 34 attached to the inlet port assembly 32. The inlet port assembly 32 is rotatable so that when the shield 44 is attached to the engine 22, the opening 38 of the inlet port assembly 32 may be positioned downward, out of the way of the shield 44, and when access to the opening 38 of the inlet port assembly 32 is required, the inlet port assembly 32 may be rotated upward, so that the opening 38 is orientated in a vertically upright position.

The inlet port assembly 32 rotates between a fill position 46, shown in solid lines in FIG. 2, and at least one operating position, two of which are shown in phantom lines in FIG. 2. When in the fill position 46, the opening 38 of the inlet port assembly 32 is positioned in the vertically upright position. When in one of the operating positions, the opening 38 of the inlet port assembly 32 is positioned in a non-vertical position, and is preferably positioned in a vertically downward position. As noted above, the packaging of the shield 44 prevents the opening 38 of the inlet port assembly 32 from being positioned in the vertically upright position. Accordingly, it should be appreciated that the when the shield 44 is attached, the shield 44 prevents rotation of the inlet port assembly 32 into the fill position 46. In contrast, when the shield 44 is detached from the engine 22, the shield 44 is spaced from the inlet port assembly 32, and allows rotation of the inlet port assembly 32 into the fill position 46.

The at least one operating position may include any number of non-vertically upright positions disposed radially about a central axis 48 of the housing 40. Accordingly, the opening 38 may be continuously rotatable about the axis to any radial position about the axis. Alternatively, the inlet port assembly 32 may be configured to define a pre-determined number of pre-set positions relative to the intercooler 24. For example, the operating position may include but is not limited to, a first operating position 50 and a second operating position 52. The first operating position 50 and the second operating position 52 are pre-set positions that the inlet port assembly 32 rotates into to allow the shield 44 to be properly placed over and attached to the engine 22. For example, the first operating position 50 may include a position that is rotated about the central axis 48 from the vertically upright fill position 46, in a first rotational direction, an angle 54 of between 45° and 180°. Preferably, the first operating position 50 is rotated about the central axis 48 from the fill position 46 an angle of between 90° and 120° so that the opening 38 is at least horizontal too or extends below a horizontal plane. Similarly, the second operating position 52 may be rotated about the central axis 48 from the fill position 46, in a second rotational direction that is opposite the first rotational direction, an angle 56 of between 45° and 180°. Preferably, the second operating position 52 is rotated about the axis from the fill position 46 an angle of between 90° and 120°. So that the opening 38 is at least horizontal too or extends below the horizontal plane. It should be appreciated that the operating position(s) may differ from the exemplary positions shown in the Figures and described herein.

Figure 4:
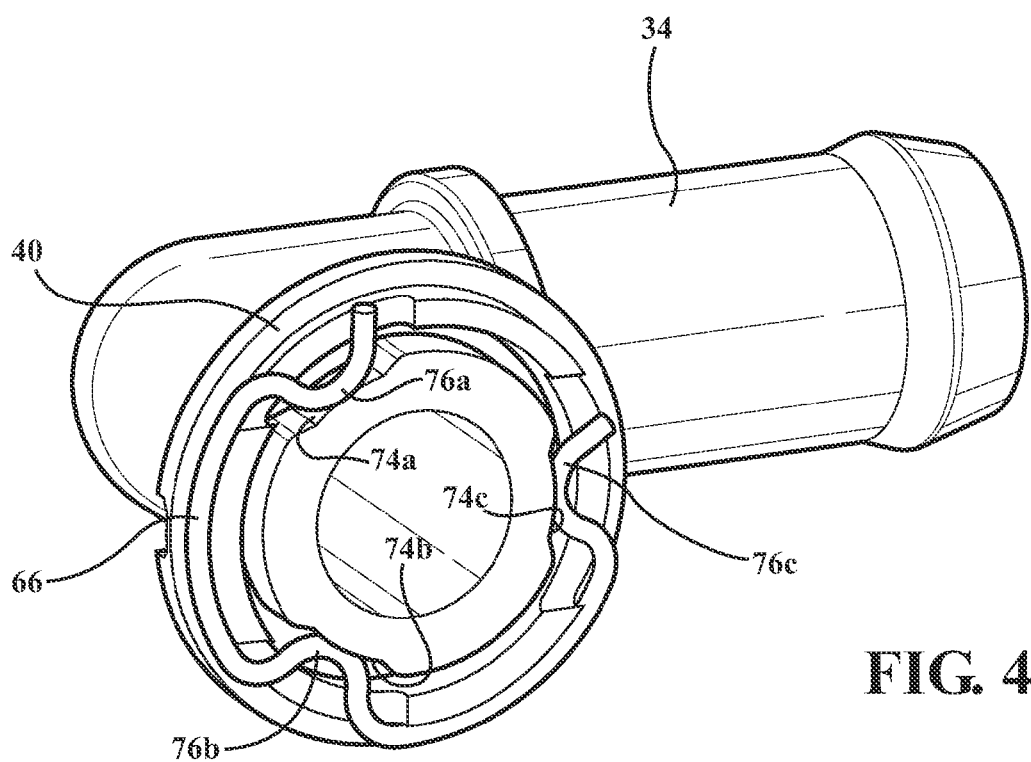
FIG. 4 is a schematic perspective view of the inlet port assembly taken along a central axis.
Figure 3:
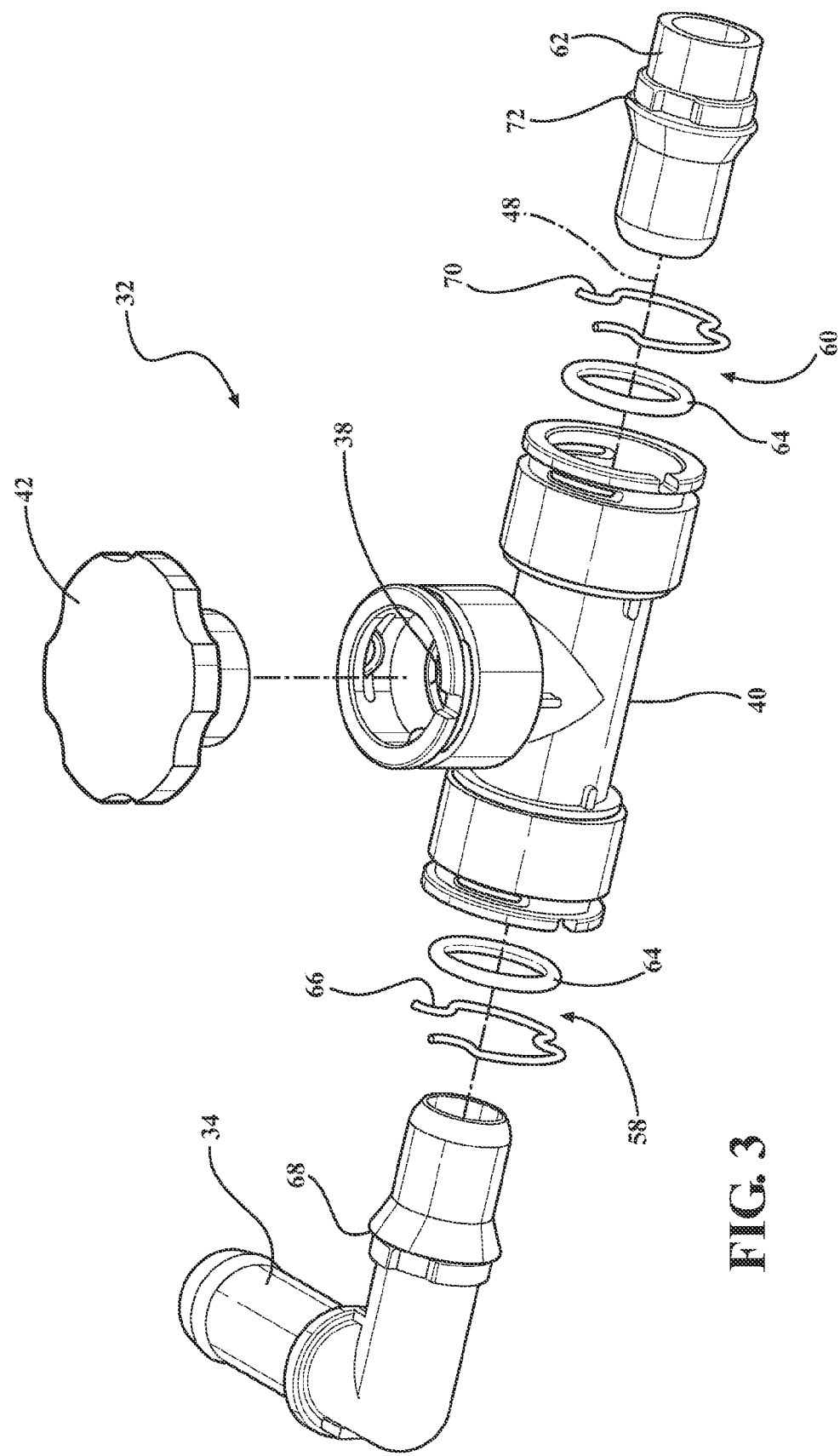
FIG. 3 is a schematic exploded perspective view of the inlet port assembly.

Referring to FIGS. 3 and 4, in order to facilitate rotation of the inlet port assembly 32 relative to the intercooler 24 and the first fluid line 34 attached to the inlet port assembly 32, the inlet port assembly 32 includes a first rotatable radial seal 58 in sealing engagement with the first fluid line 34, and a second rotatable seal in sealing engagement with the intercooler 24. The first rotatable radial seal 58 maintains a fluid tight seal between the inlet port assembly 32 and the first fluid line 34 attached to the inlet port assembly 32 during rotation of the inlet port assembly 32 between the fill position 46 and the operating positions. The second rotatable radial seal 60 maintains a fluid tight seal between the inlet port assembly 32 and the intercooler 24 during rotation of the inlet port assembly 32 between the fill position 46 and the operating positions. The first rotatable radial seal 58 and/or the second rotatably seal may include, but are not limited to, one of a quick connect radial seal or a shaft seal. For example, the second rotatable radial seal 60 may include a shaft seal allowing rotation of the inlet port assembly 32 relative to the intercooler 24, while maintaining a continuous attachment therebetween, and the first rotatable radial seal 58 may include a quick connect radial seal to allow the inlet port assembly 32 to be easily and quickly detached from the first fluid line 34 attached thereto. Alternatively and as shown, both the first rotatable radial seal 58 and the second rotatable radial seal 60 may include quick connect radial seals.

The first rotatable radial seal 58 and the second rotatable radial seal 60 may be configured in any suitable manner capable of sealing between the housing 40 of the inlet port assembly 32 and the first fluid line 34, and between the housing 40 of the inlet port assembly 32 and an inlet 62 of the intercooler 24. For example, as shown in FIGS. 3 and 4, each of the first rotatable radial seal 58 and the second rotatable radial seal 60 include an annular seal 64 disposed within the housing 40 of the inlet port assembly 32 and in sealing engagement with an outer surface of the first fluid line 34 and an outer surface of the inlet 62 into the intercooler 24 respectively. A first snap clip 66 at least partially extends through the housing 40 into engagement with the first fluid line 34, and engages the first fluid line 34 behind an outwardly extending radial ridge 68 to prevent removal of the first fluid line 34 from the housing 40. A second snap clip 70 at least partially extends through the housing 40 into engagement with the inlet 62 of the intercooler 24, and engages the inlet 62 behind an outwardly extending radial ridge 72 to prevent removal of the inlet port assembly 32 from the inlet 62 of the intercooler 24.

Figure 5:
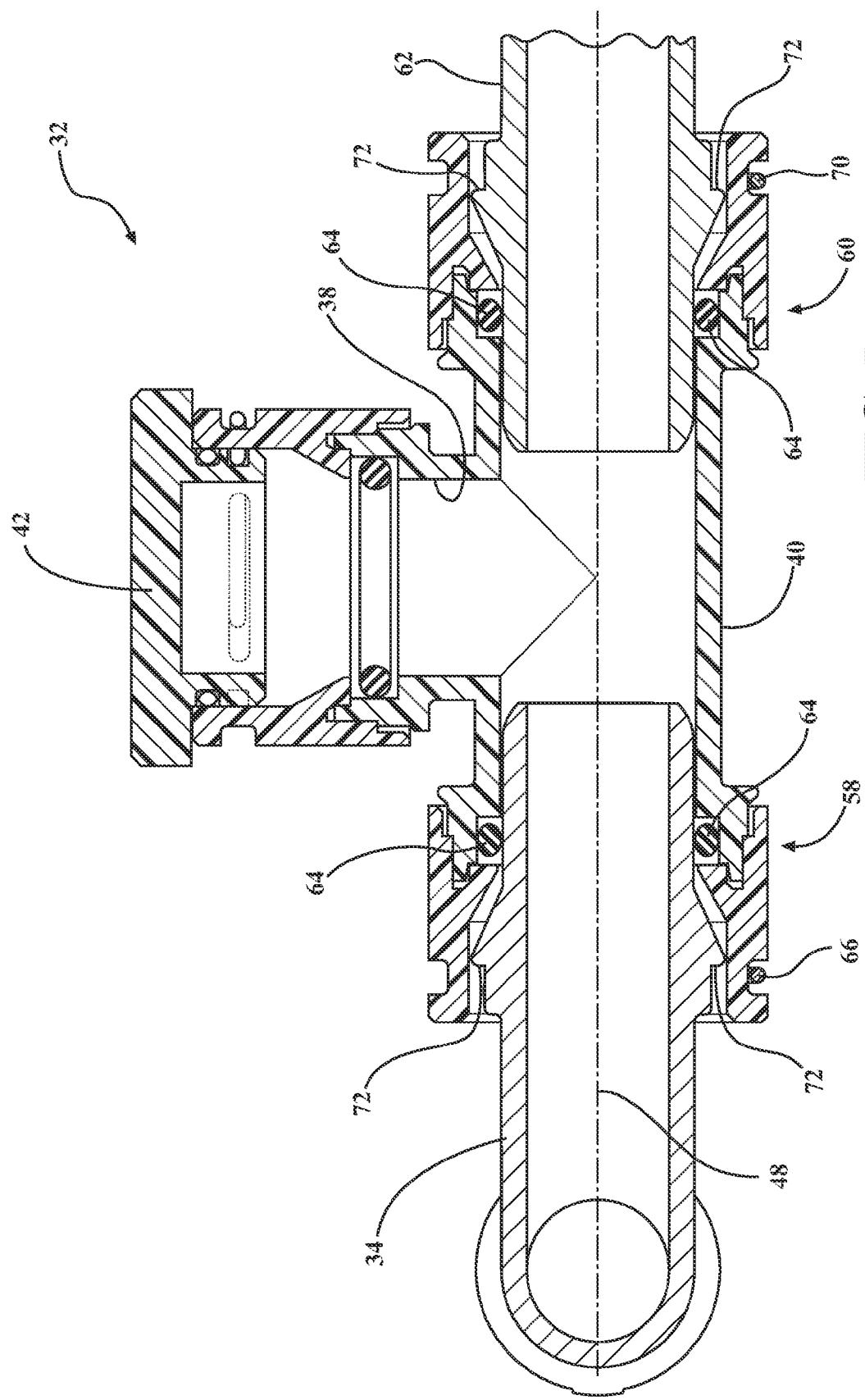
FIG. 5 is a schematic cross sectional view of the inlet port assembly taken perpendicular to the central axis.

Referring to FIG. 5, the first fluid line 34 defines three inwardly extending radial indentations 74a, 74b, 74c that are radially spaced about the central axis 48 and equidistantly spaced from each other approximately 120°. The first snap clip 66 includes three contact portions 76a, 76b, 76c that engage each of the three indentations 74a, 74b, 74c in the first fluid line 34. The three contact portions 76a, 76b, 76c and the three indentations 74a, 74b, 74c are configured such that, with sufficient force, the housing 40 may be rotated about the central axis 48 between the fill position 46, the first operating position 50 and/or the second operating position 52. When the housing 40 is rotated out of one of the fill position 46, the first operating position 50, or the second operating position 52, the contact portions 76a, 76b, 76c of the first snap clip 66 spring outward and disengage the indentations 74a, 74b, 74c, thereby allowing the housing 40 to rotate. When the housing 40 is rotated 120° about the central axis 48, each of the three contact portions 76a, 76b, 76c of the first snap clip 66 align with one of the indentations 74a, 74b, 74c of the first fluid line 34 and spring radially inward into interlocking engagement to secure the position of the housing 40. It should be appreciated that the second rotatable radial seal 60 is configured in the same manner as the first rotatable radial seal 58, with the second snap clip 70 having three contact portions (not shown) engaging three indentations (not shown) defined by the inlet 62 of the intercooler 24.

While the detailed description above describes the inlet port assembly 32, and the opening 38 thereof, as being rotatable relative to the intercooler 24 and the first fluid line 34 of the cooling system 26 for the intercooler 24 to comport to the packaging requirements of the shield 44, it should be appreciated that the rotatable inlet port assembly 32 may be incorporated into some other fluid system of the vehicle 20 to improve and/or relieve packaging constraints associated thereto.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A fluid system for a vehicle, the fluid system comprising:
    at least one fluid line defining a fluid flow circuit for circulating a fluid therethrough; and
    an inlet port assembly attached to the at least one fluid line, and defining an opening in fluid communication with the fluid flow circuit for introducing the fluid into the fluid flow circuit;
    wherein the inlet port assembly is rotatable about an axis relative to the at least one fluid line between a fill position and at least one operating position, with the opening disposed in a vertically upright orientation when the inlet port assembly is disposed in the fill position, and with the opening disposed in a non-vertical orientation when the inlet port assembly is disposed in the at least one operating position.

2. A fluid system as set forth in claim 1 wherein the inlet port assembly includes a rotatable radial seal in sealing engagement with the at least one fluid line to maintain a fluid tight seal between the inlet port assembly and the at least one fluid line during rotation of the inlet port assembly between the fill position and the at least one operating position.

3. A fluid system as set forth in claim 2 wherein the rotatable radial seal includes a quick connect radial seal.

4. A fluid system as set forth in claim 1 wherein the inlet port assembly includes a housing defining the opening, and a cap removeably attached to the housing for sealing the opening.

5. A fluid system as set forth in claim 1 wherein the at least one operating position includes a first operating position rotated about the axis in a first rotational direction from the fill position an angle of between 45° and 180°.

6. A fluid system as set forth in claim 5 wherein the first operating position is rotated about the axis from the fill position an angle of between 90° and 120°.

7. A fluid system as set forth in claim 5 wherein the at least one operating position includes a second operating position rotated about the axis in a second rotational direction from the fill position, opposite the first rotational direction, an angle of between 45° and 180°.

8. A fluid system as set forth in claim 7 wherein the second operating position is rotated about the axis from the fill position an angle of between 90° and 120°.

9. A fluid system as set forth in claim 1 further comprising a cooling device in fluid communication with the at least one fluid line and partially defining the fluid flow circuit, wherein the inlet port assembly is attached to the cooling device and rotatable relative to the cooling device between the fill position and the at least one operating position.

10. A fluid system as set forth in claim 9 wherein the inlet port assembly includes a rotatable radial seal in sealing engagement with the cooling device to maintain a fluid tight seal between the inlet port assembly and the cooling device during rotation of the inlet port assembly between the fill position and the at least one operating position.

11. A fluid system as set forth in claim 10 further comprising a shield moveably positioned relative to the cooling device to define an attached position and a detached position, wherein the shield covers the inlet port assembly and prevents rotation of the inlet port assembly into the fill position when the shield is disposed in the attached position, and wherein the shield is spaced from the inlet port assembly to allow rotation of the inlet port assembly into the fill position when the shield is disposed in the detached position.

12. A vehicle comprising:
    an intercooler configured for cooling a flow of compressed combustion air from a compressor;
    a liquid cooling system in fluid communication with the intercooler and including at least one fluid line defining a fluid flow circuit for circulating a coolant through the intercooler; and
    an inlet port assembly attached to the intercooler and interconnecting the intercooler and the at least one fluid line, wherein the inlet port assembly defines an opening in fluid communication with the fluid flow circuit for introducing the coolant into the fluid flow circuit;
    wherein the inlet port assembly is rotatable relative to the intercooler and the at least one fluid line between a fill position and at least one operating position, with the opening disposed in a vertically upright orientation when the inlet port assembly is disposed in the fill position, and with the opening disposed in a non-vertical orientation when the inlet port assembly is disposed in the at least one operating position.

13. A vehicle as set forth in claim 12 wherein the inlet port assembly includes a first rotatable radial seal in sealing engagement with the at least one fluid line to maintain a fluid tight seal between the inlet port assembly and the at least one fluid line during rotation of the inlet port assembly between the fill position and the at least one operating position.

14. A vehicle as set forth in claim 13 wherein the inlet port assembly includes a second rotatable radial seal in sealing engagement with the intercooler to maintain a fluid tight seal between the inlet port assembly and the intercooler during rotation of the inlet port assembly between the fill position and the at least one operating position.

15. A vehicle as set forth in claim 14 wherein at least one of the first rotatable radial seal and the second rotatable radial seal includes one a quick connect radial seal or a shaft seal.

16. A vehicle as set forth in claim 12 wherein the at least one operating position includes a first operating position rotated about the axis in a first rotational direction from the fill position an angle of between 45° and 180°.

17. A vehicle as set forth in claim 16 wherein the first operating position is rotated about the axis from the fill position an angle of between 90° and 120°.

18. A vehicle as set forth in claim 16 wherein the at least one operating position includes a second operating position rotated about the axis in a second rotational direction from the fill position, opposite the first rotational direction, an angle of between 45° and 180°.

19. A vehicle as set forth in claim 18 wherein the second operating position is rotated about the axis from the fill position an angle of between 90° and 120°.

20. A vehicle as set forth in claim 12 further comprising a shield moveably positioned relative to the intercooler to define an attached position and a detached position, wherein the shield covers the inlet port assembly and prevents rotation of the inlet port assembly into the fill position when the shield is disposed in the attached position, and wherein the shield is spaced from the inlet port assembly to allow rotation of the inlet port assembly into the fill position when the shield is disposed in the detached position.

* * * * *